March 8, 1966
R. UNTERBERGER
3,238,792
GYROSCOPIC INSTRUMENT
Filed April 22, 1964
4 Sheets-Sheet 1
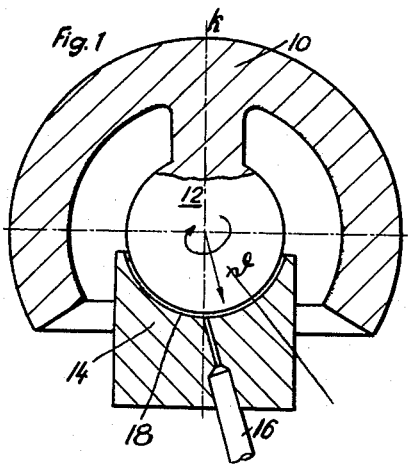
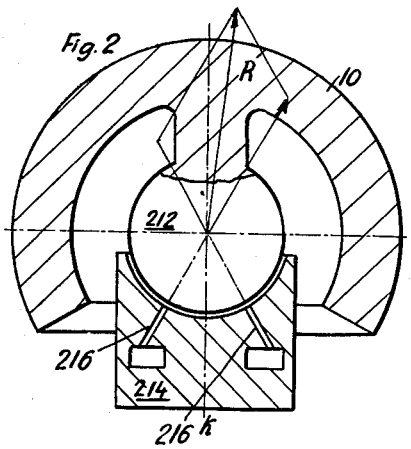
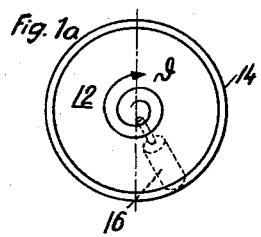
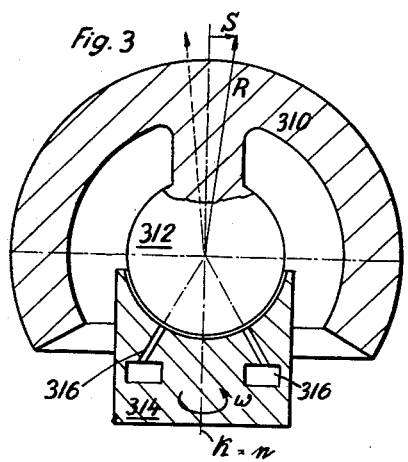
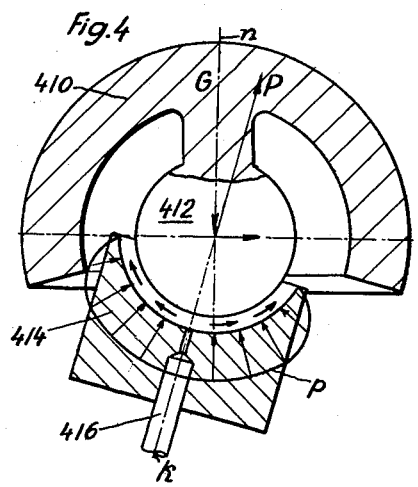
Inventor
Richard Unterberger
By: [signature]
Attorney

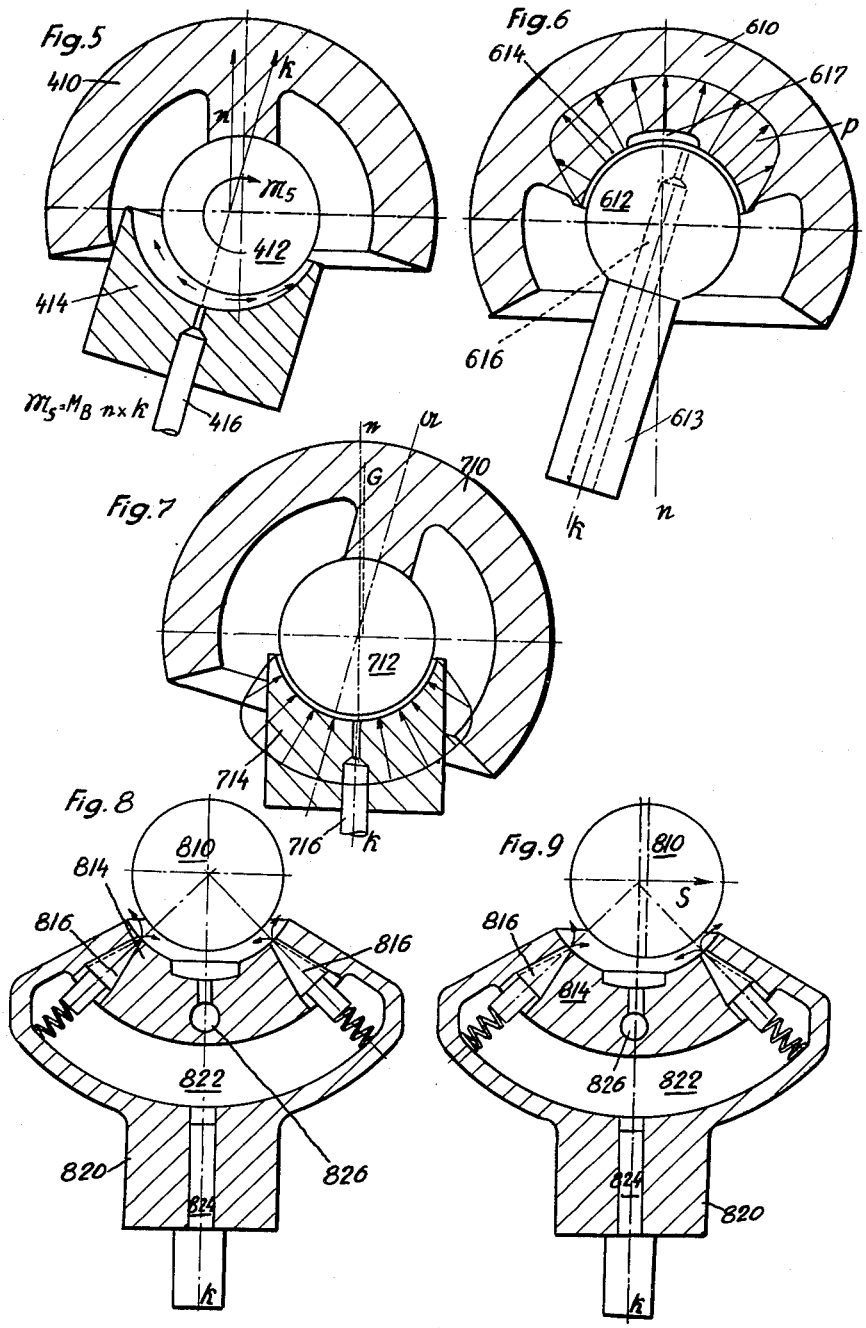

March 8, 1966  R. UNTERBERGER  3,238,792
GYROSCOPIC INSTRUMENT
Filed April 22, 1964  4 Sheets-Sheet 3
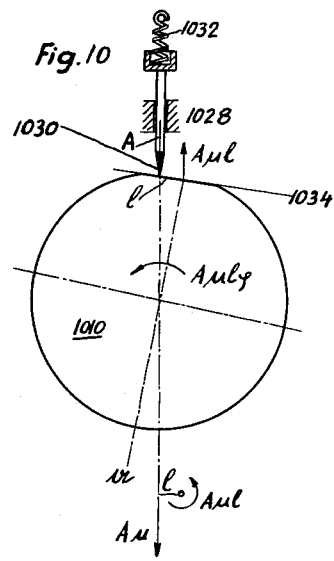
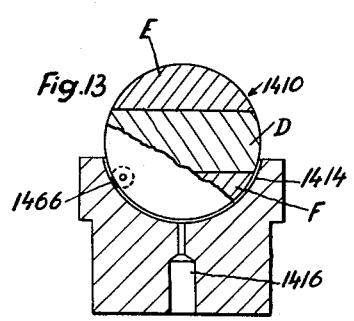
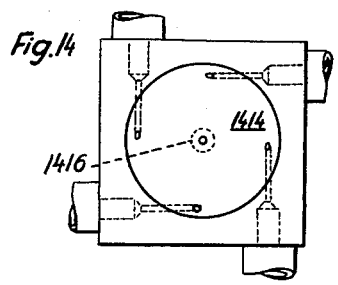
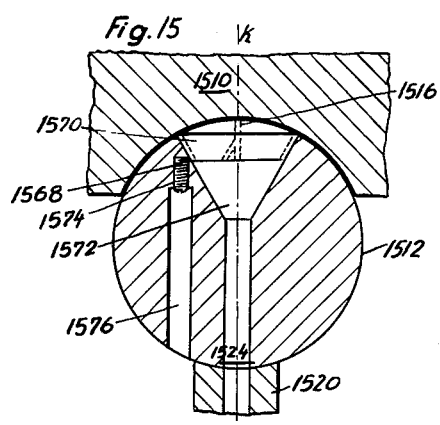
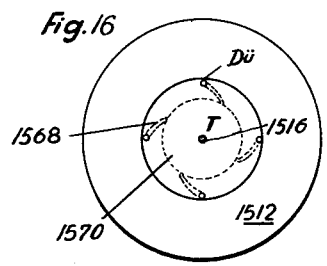
Inventor
Richard Unterberger
By
Attorney

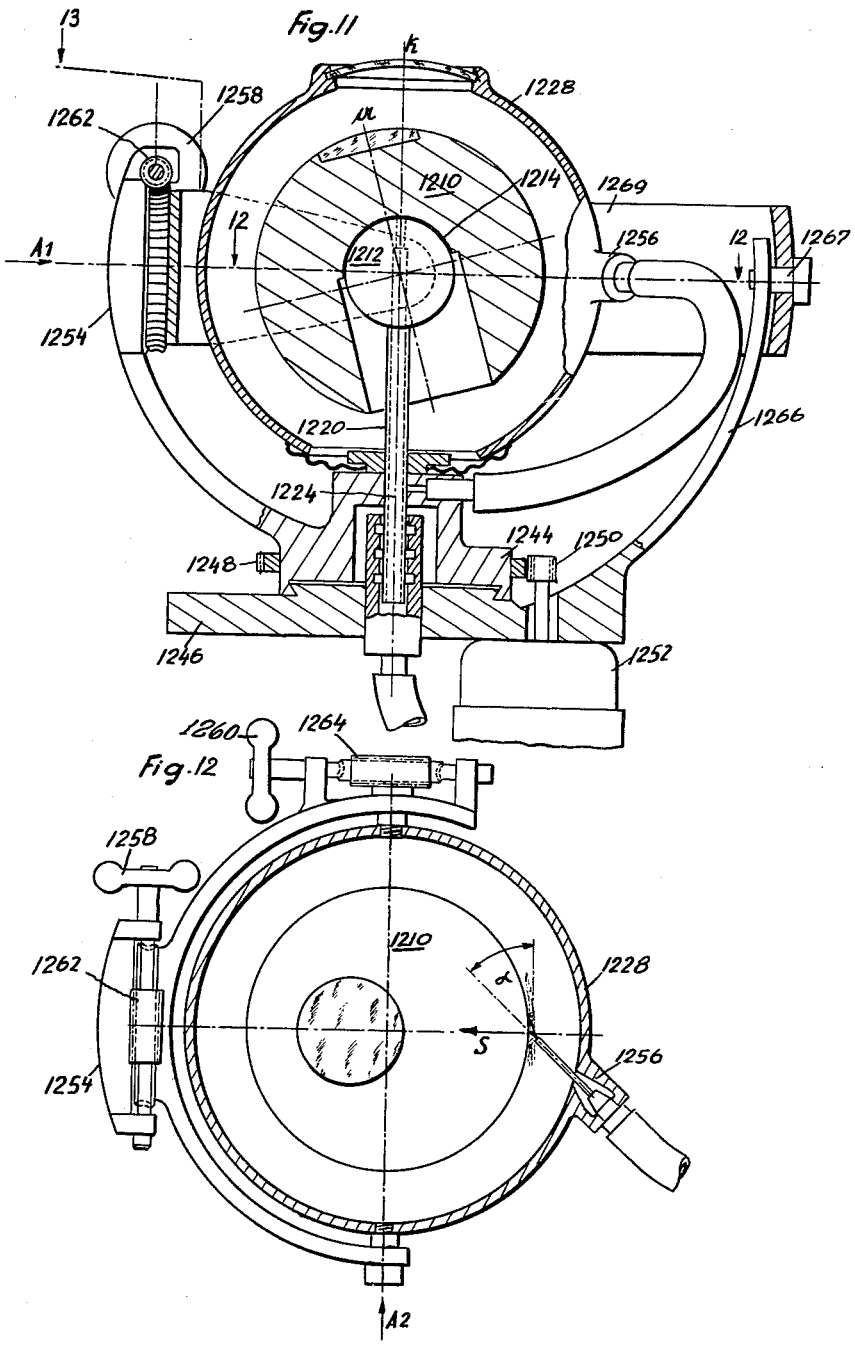

United States Patent Office 3,238,792
Patented Mar. 8, 1966

3,238,792
GYROSCOPIC INSTRUMENT
Richard Unterberger, Munich, Germany, assignor to Anschütz & Co. G.m.b.H., Kiel-Wik, Germany, a limited-liability company of Germany
Filed Apr. 22, 1964, Ser. No. 361,690
12 Claims. (Cl. 74—5.7)

My invention relates to a gyroscopic instrument, and more particularly to the instrument of the type in which the spinning movement is imparted to the gyroscope by flow of a fluid, the gyroscope being supported for rotation on a bearing consisting of a member having a convex spherical surface and a member having a concave spherical surface complementary thereto.

The gyroscopic theory shows that the spinning axis $v$ of a gyroscope having a high rotary speed and mounted for three degrees of freedom of rotation about the three principal axes $i$, $j$ and $k$ would maintain its position in space for an indefinite period of time in the absence of any interfering torques exerted upon the gyroscope and further provided that its center of gravity accurately coincides with its center of support. It is required, however, for maintaining the speed of the gyroscope, to apply a spinning torque to the gyroscope from the support axis R or from a member of the instrument surrounding the gyroscope. On account of this spinning torque, the axis $v$ of rotation of the gyroscope will tend to wander into a position coinciding with the vector of the spinning torque, which vector may coincide with the supporting axis R. The wandering movement is governed by the exponential law expressed by the equation $$\varphi = \varphi_0 e^{-t \cdot \frac{R}{B}}$$

In this equation $\varphi_0$ is the original angular departure of the spinning axis from the supporting axis at the time $t=0$, R is a factor corresponding to the frictional troque of the bearing, and B is the moment of momentum of the gyroscope axis.

The term B/R ln 2 is known as the "half value time" T. Such instruments are well known and are used in vessels or vehicles to indicate the vertical.

Where the half value time is large, the spinning axis will no longer move into the position coinciding with the supporting axis but on account of the angular speed $\omega_0$ of the globe about the globe axis $y$ will be somewhat deflected towards west, where the supporting axis R is vertical. This reaction of the gyroscope is expressed by the equation $$(\eta - v)R + vB = 0$$
$$v = \omega_0 v \times y$$

In this equation $\eta$ is a vertical vector.

The term $(\eta - v)R$ is the torque erecting the gyroscope axis and the term $vB$ represents the variation of the component B of the moment of momentum caused by the rotation of the globe. As a result, the departure towards the west is obtained as $$\varphi_e \sim \frac{B}{R} \omega_0 \cos \delta$$

In this equation, $\delta$ is the geographical latitude. In our latitudes ($\delta = 48°$) this departure towards the west amounts to about 2.5° where the half value time amounts to 10 minutes. One could use this property for determining the east-west direction but, up to the present, it has not yet been possible to develop a gyroscopic instrument in which the driving means and the bearing means meet exactly the above requirements since because of the bearing friction couples are produced within the plane $v\eta$ which reduce the half value time excessively. Moreover, couples perpendicularly to the plane $v\eta$ are caused which produce an undesirable precession movement.

It is the object of my invention to provide a gyroscopic instrument in which the bearing friction of the gyroscope is reduced to a negligible value and in which the driving means imparting the spinning movement to the gyroscope will act independently of the inclination of the gyroscope axis so that no couples are produced in a direction perpendicular to the plane including the spinning axis and the support axis. Expressed in other terms, it is the primary object of my invention to provide a gyroscopic instrument in which the spinning torque acts about an exactly defined substantially vertical axis only and in which no interfering couples are produced by the bearing.

Further objects of my invention will appear from a detailed description following hereinafter of a number of preferred embodiments with reference to the accompanying drawings. I wish it to be clearly understood, however, that my invention is in no way restricted or limited to the details of such embodiments but is capable of numerous modifications within the scope of the appended claims and that the terms and phrases used in such detailed description have been chosen for the purpose of explaining rather than that of restricting or limiting my invention.

In the drawings

FIG. 1 is a vertical section taken through the gyroscope and through the gyroscope bearing member of a gyroscopic instrument, the gyroscope being hollow and open at the bottom, the convex spherical bearing surface being formed within the cavity of the gyroscope by a portion of the latter, FIG. 1a a plan view of the bearing member shown in FIG. 1, FIG. 2 a partial illustration of a gyroscopic instrument similar to that of FIG. 1 provided with a modified bearing member, FIG. 3 a view similar to that of FIGS. 1 and 2 of a modified instrument in which the bearing member is rotatable, FIG. 3a is a diagram illustrating forces exerted upon the gyroscope, FIGS. 4 and 5 are vertical sections taken through an instrument similar to that of FIG. 1, FIG. 6 is a vertical section taken through a gyroscopic instrument in which the concave spherical bearing surface is formed by the gyroscope, FIG. 7 is a vertical section taken through a gyroscopic instrument similar to that of FIG. 1 in which the bearing forces are illustrated, FIGS. 8 and 9 are sectional side views of a gyroscopic instrument in which the gyroscope is formed by a member having a continuous spherical surface a portion of which constitutes the bearing surface, FIG. 10 illustrates means for adjusting the spinning axis of the gyroscope into a predetermined starting position, FIG. 11 is a vertical sectional view of a gyroscopic instrument provided with a rotatably mounted housing having driving nozzles attached thereto and being adjustable about two axes, FIG. 12 is a horizontal section along the line 12—12 of FIG. 11, FIG. 13 is a vertical sectional view of a gyroscopic instrument similar to that of FIGS. 8 and 9, FIG. 14 is a plan view of the instrument shown in FIG. 13, FIG. 15 is a vertical sectional view of a gyroscopic instrument similar to that of FIG. 6, and FIG. 16 is a plan view of the spherical supporting member of the instrument shown in FIG. 15.

The gyroscope 10 shown in FIG. 1 is formed by a hollow body having an outer smooth highly polished spherical surface and being open at the bottom. A spherical portion 12 disposed within the cavity of the hollow gyroscope is attached to or integral therewith. The convex bearing surface of the gyroscope portion 12 is disposed in concentric relationship to the outer spherical surface of the gyroscope 10 above a concave spherical surface of a bearing member 14 provided with a nozzle port, said bearing member 14 being provided with a passage-way 16 communicating with said port for delivery of a suitable fluid under pressure thereto, such as air under atmospheric pressure. The axis of the passageway 16 supplying the air for the purpose of maintaining an air cushion 18 between the convex spherical surface of bearing member 12 and the complementary concave spherical surface of stationary bearing member 14 is offset from the vertical supporting axis R extending through the center of the gyroscope. Therefore, the air issuing from the nozzle port forms a tangential stream flowing in contact with the spherical surface of the member 12 on a spiral path indicated in FIG. 1a, such path surrounding the vertical diameter of the member 12 to thereby frictionally exert a spinning torque $S$ upon the gyroscope about the axis R which coincides with said diameter. As a result, the gyroscope is spun about the supporting axis R.

Where additional means, such as those described hereinafter, are provided for exerting a main spinning torque upon the gyroscope, it depends upon the direction of rotation of the spiral flow whether the torque produced thereby upon the gyroscope increases or decreases the main spinning torque. This increase or decrease, however, would do no harm. It must be avoided, however, that the torque $S$ has a component extending at right angles to the vector of the main spinning torque. Means are preferably provided to so adjust the direction of the air passage-way 16 as to permit adjustment of the torque $S$ so as to render it accurately parallel to the main spinning torque. It will be explained hereinafter with reference to FIG. 3 how this object is attained.

The instrument illustrated in FIG. 2 differs from that shown in FIG. 1 by the provision of the bearing member 214 with a plurality of passage-ways 216 leading to apertures provided in the concave surface of member 214, said apertures being circumferentially distributed about the vertical diameter of the gyroscope 10 and being spaced from said vertical diameter substantially equal angular distances. The member 214 must be so adjustable that the resulting vector R of the frictional forces exerted by the air flow will have the same direction as the vector of the main spinning torque.

For the purpose of compensating interfering couples S extending at right angles to the vertical supporting axis R, the supporting member 14, 214 or 314 is caused to rotate about the vertical axis $\eta$ with an angular velocity of $\omega$. This rotation will cause the nozzle port delivering the tangential stream of fluid to perform an orbital motion about the vertical axis. As a result, any interfering couples S will act in all directions. Since the high inertia of the gyroscope prevents the same from yielding to these couples, the latter will not cause any departure of the gyroscope.

With reference to FIGS. 4 and 5 the cause of interfering torques extending at right angles to the support axis R will now be explained. It appears from these figures that the center of the gyroscope 410 will not be positioned on the supporting axis unless the force P resulting from the partial pressures $p$ acting on the elements of the spherical supporting surface coincides with the vertical $\eta$ so as to balance the weight G of the gyroscope. In all other cases such as that illustrated as an example in FIG. 4 where the supporting member 414 has been tilted by an exterior influence causing the force P to be angularly spaced from the weight G, a horizontal component of the force P tends to shift the spherical member 12 laterally out of alignment with the axis of supporting member 14 causing the cushion of fluid between the supporting members 412 and 414 to become unsymmetrical. As a result, the fluid which may be a liquid or a gaseous medium will be discharged out of the cushion unilaterally, as illustrated in FIG. 5. Because of this unsymmetrical flow of the fluid, an interfering torque will be produced represented by a vector which extends perpendicularly to the plane of the drawing. This vector $M_s$ is controlled by the following equation $$M_S = M_B \eta \cdot \sigma$$

In this equation $\eta$ is the vector of the vertical, $\sigma$ is the vector of the supporting axis, $M_B$ is a constant depending on the dimensions of the bearing, the load of the bearing, the thickness of the fluid cushion and the hydrostatic pressure thereof.

Experience has shown that these interfering torques $M_s$ have a magnitude in the order of the directional torques occurring in gyroscopic instruments and, therefore, must be compensated. As mentioned hereinabove, I have found that this can be accomplished by imparting rotation to the supporting member 14 about the vertical axis. Owing to such rotation the interfering torques will periodically act in all directions and, therefore, will not cause any deflection of the gyroscope as the latter reacts too slowly to be able to follow such periodic interfering torques. The order of magnitude of these interfering torques can be reduced by an appropriate arrangement of the bearing member provided with the convex spherical surface and of the bearing member provided with the concave spherical surface. Where the spinning axis of the gyroscope predominantly assumes a vertical position as is the case, for instance, where the gyroscope indicates the vertical, I prefer the arrangement illustrated in FIG. 6 in which the supporting member 612 having the convex spherical surface is carried by a base 613 projecting upwardly therefrom into the cavity of the gyroscope 610. A concave spherical surface 614 is formed by the gyroscope 610. Preferably, a recess 617 is provided in the center of the concave bearing surface. The fluid under pressure is supplied through an axial passage-way 616 of the base member 613 and of the spherical member 612 to the recess 617. As a result, an angular displacement of the base member 613 from the vertical will not result in a lateral displacement of the gyroscope because the resultant of the bearing pressure $p$ will always coincide with the vertical vector $\eta$ extending through the center of the gyroscope 610 and will thus always balance the weight thereof.

In a gyroscopic instrument in which the axis R of the supporting member 714 is predominantly in the vertical position, the arrangement of FIG. 7 is to be preferred in which a gyroscope portion 712 is provided with a convex spherical surface above the bearing member 714 which has the concave spherical surface disposed therebelow. If in this arrangement the supporting axis R is angularly displaced from the vertical direction $\eta$, the resultant of the partial bearing pressures which acts in the direction of the supporting axis R will assume an inclined position causing the gyroscope 710 to be laterally displaced so as to reduce the thickness of the cushion on one side and to increase it on the opposite side whereby a counter-pressure will be produced balancing the horizontal component of the resultant bearing pressure. As a result, the air flow will become unsymmetrical as explained hereinabove with reference to FIGS. 4 and 5 thus producing the above-mentioned interfering torque $M_s$.

The diameter of the bearing and the resulting gap accommodating the fluid cushion is of considerable influence. The interfering torque can be considerably reduced by decreasing the diameter of the bearing so that fluid under high pressure amounting up to a multiple of the atmospheric pressure must be used. Particularly objectionable are interfering torques which vary in time. For the purpose of avoiding such interfering torques throttling restrictions may be inserted in the passageways supplying the fluid to the bearing. Such restrictions will cause the bearing pressure to remain constant irrespective of small fluctuations of the fluid pressure prevailing in the source of fluid. On the other hand, the restrictions in the passageways will cause the pressure in the cushion to be increased in any area in which the thickness of the cushion is reduced owing to a lateral displacement of the gyroscope as may be caused, for instance, by accelerations. When the thickness of the air cushion in any particular area thereof is reduced, the volume of air flowing therethrough is decreased and this causes a reduction of the drop of pressure in the restricted orifice. As a result, the pressure within the cushion area under consideration will be increased so as to increase the bearing pressure.

In the embodiment of the gyroscopic instrument shown in FIG. 8, the gyroscope 810 is formed with a continuous uninterrupted outer spherical surface. Therefore, this surface is subjected to the bearing presure as well as to the flow frictionally exerting the spinning torque. The bearing member 814 provided with the concave spherical surface is mounted on and carried by a base member 820. The gaseous bearing fluid is supplied by conical nozzle members 816, the axes of such members including an angle of 45° with the supporting axis R. The nozzle members 816 are supplied with the gaseous bearing fluid from a common supply chamber 822 provided below the bearing member 814 in the base member 820. An axial passage-way 824 in the base member 820 supplies the gaseous medium from a suitable source to the chamber 822. The gaseous medium will be discharged from both the outer circumference of the gap between the gyroscope 810 in the bearing member 814 and through a coaxially disposed passage-way 826 provided in the bearing member 814 downwardly.

As illustrated in FIG. 9, a displacement of the gyroscope 810 by a lateral force S will cause the air supplied by the inclined supporting nozzles 816 to flow outwardly as well as inwardly. No couples, therefore, will be produced by friction of the flow of air with the gyroscope.

During the spin of the gyroscope the air friction acting on the outer spherical surface of the gyroscope would produce considerable interfering couples acting on the gyroscope if the air carried along by the gyroscope surface would be deprived of a possibility to follow any change of inclination of the spinning axis $v$, for instance by stationary surfaces hit by such air at a high speed. Therefore, the spherical gyroscope is preferably surrounded by a spherical housing affording the gaseous medium or air surrounding the gyroscope to follow the latter without meeting any obstructions. A certain minimum distance is required betwen the outer peripheral surface of the gyroscope and the inner peripheral surface of the housing. Moreover, the possibility exists of providing a source of vacuum communicating with the housing to thereby cause the atmospheric air to enter and to flow through the fluid ducts, such as 416 or 824, 816 for exerting the bearing pressure and, if desired, the spinning torque upon the gyroscope. The source of vacuum may be formed by a suitable pump. The consequent reduction of the air density in the housing will reduce any interfering couples. Moreover, it is possible to fill the space between the gyroscope and the housing with a suitable gaseous medium of low dynamic viscosity to thereby reduce interfering couples produced by friction.

The resultant vector of the remaining couples produced by air friction acts within a plane in which the spinning axis $v$ and the supporting axis R are disposed. For the attainment of a high half value time, this vector which tends to erect the gyroscope into the supporting axis R must be kept very small. Such components of torques as extend perpendicularly to the spinning axis $v$, as produced, for instance, lack of symmetry of the space between the gyroscope and the housing encasing the same must be preferably avoided altogether or must be compensated by rotation of the housing about the supporting axis R.

It has been discovered that in this manner the interfering couples may be reduced to such an extent that a spinning gyroscope needs hours for losing its rotary speed and that its spinning axis $v$ will remain nearly stationary in space during this time and, therefore, will incline towards the west at an angle representative of the rotary speed of the earth.

When the spinning torque of such a gyroscopic instrument is reduced or turned off, the erecting couple will be eliminated altogether permitting the spinning axis $v$ to remain stationary in space. After passage of a certain period of time, the departure of the spinning axis $v$ of the gyroscope from the vertical can be easily perceived and measured. When the spinning drive is re-energized again, the gyroscope assumes a position inclined to the vertical direction $\eta$ and, therefore, must be rapidly returned to its normal initial position. This can be effected by a friction member mounted on the housing of the gyroscope for adjustment in radial direction wtih respect to the gyroscope towards and away from the spherical surface for frictional engagement therewith. In FIG. 10 such a mechanism for adjusting the spinning axis of the gyroscope to its starting position is shown. The spherical gyroscope 1010 is surrounded by a housing 1028 provided with a radial bore in which a needle-like member 1030 is slidably guided. A spring 1032 acting on the outer end of the needle 1030 tends to move the latter into frictional engagement with a flattened face 1034 of the gyroscope. Normally, suitable means not shown will keep the needle out of engagement with the gyroscope. For the purpose of restoring the spinning axis $v$ to its starting position, the operator releases the needle causing the spring 1032 to move the needle 1030 into engagement with the gyroscope. The resulting friction produces a couple causing the gyroscope 1010 to perform a precessional movement back into the starting position.

Another way of imparting the spinning torque to the gyroscope in such a manner that the vector of the driving torque remains independent of inclinations of the gyroscope has been illustrated in FIG. 11. The gyroscope 1210 is formed with a cavity, the bottom 1214 of which forms a concave spherical surface concentrically disposed with respect to the outer spehrical surface of the gyroscope 1210. The gyroscope rests on an air cushion formed between the concave surface 1214 and the complementary convex spherical surface of a bearing member 1212 fixed to a cylindrical base member or stem 1220 formed with a longitudinal passage-way 1224 extending to a restricted orifice provided in the convex tip surface formed by member 1212. The stem 1220 is firmly fitted in the central bore of a hub member 1244 of inverted cup-shape which is mounted for rotation about the vertical supporting axis R on a base plate 1246 of the instrument. An annular gear 1248 surrounds the hub member 1244 and is suitably fixed thereto and meshes with a pinion 1250 carried by the rotor shaft of an electric motor 1252 mounted on the base plate 1246. Hence, rotation about its axis R can be imparted to the hub member 1244 and to the bearing member 1212.

The gyroscope 1210 is concentrically encased by a spherical housing 1228 adjustably connected with the hub member 1244 so as to rotate together therewith. A flow of air in contact with the spherical outer surface of the gyroscope 1210 on a path surrounding the spinning axis or diameter $v$ of said surface to thereby frictionally exert the spinning torque upon the gyroscope about the axis $v$ is produced by a nozzle 1256 carried by the housing and directing a jet of air upon the spherical surface of the gyroscope in a substantially tangential direction as shown in FIG. 12. This jet of air is comparatively narrow forming an angle α with the surface of the gyroscope and producing the tangential flow on a portion of the periphery of such surface. On account of its dynamic viscosity and of the high relative speed this air frictionally produces the spinning torque. Owing to the rotation of the hub member 1244, the nozzle 1256 performs an orbital motion about the vertical axis. The spinning axis tends to adjust itself in accordance with the average direction of flow of the jet issuing from the nozzle. The damming pressure extends radially with respect to the gyroscope and not tangentially, as would be true, if the surface of the gyroscope were provided with any irregularities, such as turbine rotor blades or the like. Therefore, the damming pressure S will not produce any couple upon the gyroscope. In event of any inclination of the spinning axis $v$ with respect to the nozzle 1256 no changes will occur with respect to the spinning couple because of the accurate concentric location of the outer spherical surface of the gyroscope with respect to the supporting member 1212. In order to obtain a spinning torque of the required power, it is necessary only that the thin jet of air issuing from the nozzle 1256 flows in intimate contact with as large a portion of the spherical surface as possible so as to ensure the required friction of the air with the spherical surface.

Any irregularies of the surface of the gyroscope would be harmful. While such irregularities might increase the spinning torque by a peripheral component of the damming pressure S, the air resistance of the spherical surface outside of the range of the jet would increase considerably and would reduce the spinning torque. As a result, a lower spinning velocity only could be attained with the same air consumption.

As the air surrounding the gyroscope 1210 is carried along by the rotating housing 1228 it will reach a speed approaching the spinning speed of the gyroscope thereby further reducing the spinning torque required. If the bearing friction would be zero, the torque to be produced by the flowing air upon the gyroscope would be small. In truth, however, the bearing friction has a positive value, even where the bearing is formed by an air cushion. Therefore, the average peripheral speed of the air must be somewhat larger at all points of the periphery of the gyroscope than the peripheral speed thereof to thereby ensure a driving torque exceeding the bearing friction.

The required adjustment of the direction of the driving torque with respect to the supporting axis R can be effected by a suitable pivotal adjustment of the nozzle 1256. As will appear from FIG. 12 showing a section taken through the housing of FIG. 11, the nozzle 1256 mounted on the housing 1228 encasing the gyroscope 1210 so as to interfere as little as possible with the peripheral flow of the air can be pivoted about the axes $A_1$ and $A_2$ by a suitable gimbal suspension including adjusting knobs 1258 and 1260 for imparting rotation to worms 1262, and 1264 respectively. With the aid of the knob 1258 the nozzle 1256 can be pivoted about the axis $A_1$ and with the aid of the knob 1260 it can be pivoted about the axis $A_2$. For the purpose of reducing any change of position of the supporting axis with respect to the spinning axis to a minimum, where the instrument is mounted on vessels or vehicles, the base plate 1246 of the instrument carrying the stem 1220 and the suspension 1254 for the housing is supported by a gimbal suspension 1266 of which FIG. 11 shows the one axis 1267 and the gimbal ring 1269 only. In this embodiment interfering couples which cannot be entirely eliminated by adjustment are compensated by rotation of the housing 1228 and the nozzle 1256 about the supporting axis R.

In FIGS. 13 and 14 I have illustrated a gyroscopic instrument similar to that described hereinabove with reference to FIGS. 8 and 9, except that the spinning torque is produced by friction with the spherical gyroscope of the air cushion supporting it. For this purpose, the spinning nozzles 1466 are provided in the bearing member and are so disposed therein as to impart rotation to the air cushion. This has the advantage of greater simplicity. By using air or another gaseous fluid under high pressure, the speed of flow of the air cushion can be made so high that the gyroscope will be spun at the required speed in spite of the short radius of the frictional driving couple. This design offers particular advantages where a source of vacuum is employed to suck atmospheric air through the nozzles 1466 into the instrument thus reducing the density of the air within the housing (not shown) surrounding the gyroscope 1410 and thus reducing the friction of the peripheral zone thereof with the air. The required adjustment can be effected by suitable differential adjustment of the air supply to the tangentially disposed nozzles 1466. In the embodiment shown in FIG. 14 a bearing nozzle 1416 is provided in addition to the spinning nozzles 1466, all of those nozzles being formed by restricted orifices provided in the concave bearing surface 1414 of the bearing member.

In FIG. 15 and FIG. 16 I have illustrated an embodiment of the invention similar to that shown in FIG. 6. The spherical bearing member 1512 is fixed to the cylindrical stem 1520. The spinning torque is exerted upon the spherical gyroscope 1510 part of which is shown only by air jets issued from restricted orifices 1568 which are inclined in both tangential and radial directions as will appear from FIG. 16. The orifices 1568 assist the bearing orifice 1516 coinciding with the supporting axis R. This system has been found particularly satisfactory where lateral forces act on the bearing. The orifices 1568 are formed by grooves cut into the conical side face of a circular disk 1570 having a spherical top face and inserted and suitably fixed in a conical bore provided in the spherical bearing member 1512 in coaxial relationship to the axis R. Preferably, the disk 1570 is fixed in the conical bore by a suitable adhesive. The gaseous medium or air is supplied to a reservoir chamber 1572 formed by the lower portion of the conical bore through an axial passage-way 1524 provided in both the spherical member 1512 and the stem 1520 carrying it. The reservoir chamber 1572 communicates with the restricted orifices 1568 opening into the air cushion confined between the concave surface of the gyroscope 1510 and the convex top surface of the bearing member 1512 complementary thereto. The air supplied to the orifices 1568 can be controlled by set screws 1574 disposed in threaded top sections of bores 1576 extending through the bearing member 1512 in parallel relationship to the axis R. The set screws 1574 are accesible through the bores 1576 from below.

From the above it will appear that in each of the instruments described hereinabove means are provided for causing a fluid, preferably a gaseous medium or air, to exert a bearing pressure upon the gyroscope to thereby keep it in floating and rotatable condition and to flow in contact with the spherical surface on a path surrounding a diameter of the surface to thereby frictionally exert a spinning torque upon the gyroscope about an axis coinciding with said diameter.

While the bearing pressure and the frictional spinning torque produced by the fluid may act on the same spherical surface as shown, for instance, in FIGS. 13 and 15, separate spherical surfaces one for exertion of the spinning torque and the other one for exertion of the bearing pressure may be provided as shown, for instance, in FIG. 11.

As shown in FIG. 13, the spherical gyroscope 1410 is composed of a central horizontal plate D consisting of a steel nickel alloy and of a top portion E and a bottom portion F both of which consist of a light metal, such as aluminum, the three parts D, E and F being firmly brazed together. Hence, the gyroscope 1410 is composed of parts having different specific weights and imparting to the gyroscope a preferred vertical axis of the moment of momentum. In other words, the momentum will be a maximum for rotation about the vertical axis whereas it would be a minimum for rotation about a horizontal axis centrally disposed with respect to the plate D.

From the foregoing it will be seen that this invention is one well adapted to attain all of the ends and objects hereinabove set forth, together with other advantages which are obvious and which are inherent to the combination.

While the invention has been described in connection with a number of preferred embodiments thereof, it will be understood that it is capable of further modification, and this application is intended to cover any variations, uses, or adaptations of the invention following, in general, the principles of the invention and including such departures from the present disclosure as come within known of customary practice in the art to which the invention pertains, and as fall within the scope of the invention or the limits of the appended claims.

What I claim is:

1. In a gyroscopic instrument the combination comprising a gyroscope rotor having a smooth spherical surface, means causing a tangential stream of fluid to act on said peripheral surface for spinning said gyroscope rotor about an axis, said means including at least one nozzle from which said stream issues, a bearing member mounted below said gyroscope rotor and having fluid-conducting means causing a fluid to exert a bearing pressure upon said gyroscope rotor to thereby keep it in floating and rotatable condition, means for mounting said nozzle for orbital motion about said axis extending through the center of said gyroscope rotor, and driving means for imparting an orbiting movement to said nozzle about said axis.

2. The combination claimed in claim 1 further comprising a housing encasing said gyroscope and carrying said nozzle and having an internal spherical surface concentrically disposed with respect to said gyroscope.

3. The combination claimed in claim 2 in which said bearing member is mounted for common rotation about said axis with said housing.

4. The combination claimed in claim 1 in which said gyroscope has a spherical surface above said bearing member in opposed relationship thereto.

5. The combination claimed in claim 4 in which the spherical surface above said bearing member is a concave surface, said bearing member being formed with a convex spherical surface in opposed relationship thereto.

6. The combination claimed in claim 1 further comprising means for adjusting the direction of said nozzle.

7. The combination claimed in claim 2 further comprising means for maintaining a sub-atmospheric pressure within said housing.

8. The combination claimed in claim 1 in which said nozzle is mounted on said bearing member.

9. The combination claimed in claim 4 in which the spherical surface above said bearing member has a radius smaller than the radius of the peripheral spherical surface of said gyroscope.

10. The combination claimed in claim 1 in which said gyroscope is formed with an outer spherical surface and with a cavity having an internal spherical surface concentric with said outer spherical surface, said combination further including a base supporting said bearing member which extends upwardly into said cavity and is formed with a convex sepherical tip face disposed in opposed relation to said internal spherical surface and with a passageway communicating with a port provided in said tip face for the delivery of fluid under pressure to thereby keep the gyroscope in rotatable and floating condition above said tip face, said nozzle being disposed tangentially to said outer spherical surface.

11. The combination claimed in claim 1 in which said gyroscope is formed with a single continuous spherical surface.

12. The combination calimed in claim 1 in which said axis is vertically disposed.

References Cited by the Examiner
UNITED STATES PATENTS

| | | | |
|---|---|---|---|
| 1,385,423 | 7/1921 | Bibbins | 74—5.7 X |
| 1,629,577 | 5/1927 | Klahn | 74—5.7 |
| 2,133,809 | 10/1938 | Carter et al. | 74—5.7 X |
| 2,729,106 | 1/1956 | Mathiesen | 74—5 X |

FOREIGN PATENTS

| | | |
|---|---|---|
| 990,701 | 4/1965 | Great Britain. |

BROUGHTON G. DURHAM, *Primary Examiner.*

JACK D. PUFFER, *Assistant Examiner.*